United States Patent [19]
Graille et al.

[11] Patent Number: 5,264,226
[45] Date of Patent: Nov. 23, 1993

[54] PROCESS FOR PREPARING DAIRY PRODUCTS WITH A LOW CONTENT OF STEROLS, PARTICULARLY OF CHOLESTEROL

[75] Inventors: Jean Graille, Villeneuve les Maguelonne; Daniel Pioch, Prades le Lez; Michel Serpelloni, Beuvry les Bethune; Leon Mentink, Estaires, all of France

[73] Assignee: Roquette Freres, France

[21] Appl. No.: 785,149

[22] Filed: Oct. 31, 1991

Related U.S. Application Data

[63] Continuation of Ser. No. 545,063, Jun. 29, 1990, abandoned.

[30] Foreign Application Priority Data

Jul. 12, 1989 [FR] France ............................ 89 09443

[51] Int. Cl.$^5$ ................................................ A23C 9/12
[52] U.S. Cl. ...................................... 426/34; 426/422; 426/491; 426/586
[58] Field of Search ............... 426/417, 491, 614, 603, 426/586, 480, 641, 663, 664, 34, 422; 554/8, 193

[56] References Cited

U.S. PATENT DOCUMENTS 3,491,132  1/1970  Reiners et al. .

4,880,573  11/1989  Courregelongue et al. ... 426/417 X

FOREIGN PATENT DOCUMENTS 0174848  3/1986  European Pat. Off. .
0318326  5/1989  European Pat. Off. .

OTHER PUBLICATIONS

Potter, N. N., Food Service, 1978, pp. 380–390, 404–411, 491–495, AVI, Westport, CT.
Starke, vol. 34, No. 11, 1982, pp. 379–385; J. Szejtli: "Cyclodextrins in Food, Cosmetics and Toiletries".
Patent Abstracts of Japan, vol. 6, No. 114 (C-110) [992], Jun. 25, 1982; & JP-A-57 43 639 (Toshiyoki Oota).

*Primary Examiner*—Joseph Golian
*Assistant Examiner*—Leslie Wong
*Attorney, Agent, or Firm*—Larson & Taylor

[57] ABSTRACT

The present invention relates to a process for preparing dairy products with a low content of sterols, particularly of cholesterol, characterized in that it consists essentially of contacting an oil-in-water emulsion comprising dairy fats with cyclodextrin in sufficient amount to form inclusion complexes with the sterols so that the latter can be extracted from the fat, and simultaneously or not, separating at least partly said complexes from the medium without inverting the starting oil-in-water emulsion.

17 Claims, No Drawings

PROCESS FOR PREPARING DAIRY PRODUCTS WITH A LOW CONTENT OF STEROLS, PARTICULARLY OF CHOLESTEROL

This application is a continuation of application Ser. No. 545,063 filed Jun. 29, 1990, now abandoned.

TECHNICAL FIELD

The present invention relates to a process for preparing dairy products with a low content of sterols, particularly of cholesterol.

BACKGROUND OF THE INVENTION

The starting materials used in the process according to the invention are oil in water emulsions comprising fats of dairy origin like, for example, milk or cream. Milk is a liquid secreted by mammalian glands of female mammals. It is composed of five major constituents:
lipids essentially in the form of triglycerides,
proteins,
glucids,
salts,
water.

Cream is in fact a milk enriched in fat by spontaneous scumming or centrifuging. It contains therefore the same major elements as milk but in different proportions.

These two products also comprise constituents present in very minimal amounts like lecithins, vitamins, enzymes, dissolved gases, the fatty acids present naturally in the milk and/or arising from the hydrolysis of triglycerides, and sterols. The latter are essentially represented by cholesterol to the extent of 98% and are substances associated with the fat. The fat of cows' milk contains about 0.3% of cholesterol namely 0.1 g per liter of milk.

Now it has been established for a long time that high blood levels of cholesterol (cholesterol LDL) are in direct correlation with serious cardio-vascular deseases.

The principal of these is arteriosclerosis which is manifested by the alteration of the wall of the arteries and of which one of the causes is the localized, excessive and abnormal deposit of cholesterol on the inner surface of the wall of an artery. The atheroma so formed can have tragic consequences like myocardial infarctus. By way of illustration, it may be indicated that a reduction of 1% of the total blood cholesterol results in a reduction of 2% of the coronary risk. The excess of cholesterol can also be the cause of gallstones.

Prevention remains one of the most effective means for remedying these pathologies. It can consist of reducing as much as possible the ingestion of foods rich in cholesterol or indeed also of consuming foodstuffs with a low cholesterol content.

One of the concerns of industrialists in the food industry is hence to eliminate the cholesterol from products of current consumption and particularly dairy products.

Thus there have already been proposed various methods of extraction of sterols from fats.

One of them consists of contacting the animal fat with digitonin which has the property of reacting with the cholesterol to give a precipitate. The performances and the results of this method are not satisfactory due to the fact of the difficulty of separation of the precipitate from the medium. This method is, in any event, inapplicable industrially.

The cholesterol can also be extracted from fats by entrainment by means of a solvent. The major drawback of this method is that the solvents generally employed are toxic and that traces of them always remain in the fats concerned.

There are also known methods of microdistillation, which are inapplicable at the industrial level, or again adsorption on columns, as is described, for example, in European patent application nos. EP n° 0 174 848 and EP n° 0 318 326. These applications teach a method according to which the fat kept in the liquid state passes through an adsorbent column, in the event activated charcoal. It is clear that such a process is very cumbersome to put into practice and, moreover, the extraction that it enables is not very selective.

Another physico-chemical process of extraction of the cholesterol from fats is disclosed by the Japanese patent application JP n° 59/140299. It consists of contacting a dry substance charged with cholesterol such as milk powder, with supercritical $CO_2$ at a temperature comprised between 35° and 45° C. and at a pressure comprised between 130 and 200 atm. The production of these physical conditions necessitates the employment of complex and expensive equipment. The management of the process is thus very delicate. Moreover, as is specified in the patent application, other lipid compounds are entrained by the supercritical $CO_2$. This process is hence not selective.

To remove the sterols from fats, there has also been contemplated a process of biodegradation of said sterols disclosed by the patent application n° EP 0 278 794 and employing bacteria which, contacted with the fat, are capable of metabolizing at least one of the sterols that it contains. Like all methods involving fermentations, this biodegradation process is very delicate to manage due to the fact of the inherent variability of living matter. In addition, the equipment employed, the relatively long duration, are, among other things, elements which render such a process expensive. Finally, the catabolites produced in these fermentations remain until now totally unknown on the level of their nature and their toxicity, and are, in any case, present in the fats so treated.

There is also known, through European patent application EP n° 0 256 911, a process for removing cholesterol contained in animal fat. It is based on the property already disclosed of cyclic cyclodextrinspolyglucoses of frustoconic tubular conformation with 6, 7 or 8 glucose units and denoted respectively by alpha, beta or gamma- of receiving in their hydrophobic central cavity sterol molecules and especially cholesterol, to form water-soluble inclusion complexes. According to this process, the fat kept fluid is contacted with a cyclodextrin with stirring for 30 minutes to 10 hours so as to enable the formation of complexes. The separation of the latter is then carried out by introduction into the reaction medium of water which solubilizes these complexes. The aqueous solution thus obtained is then collected after decantation.

The efficiency of extraction of the cholesterol by this process is not great. In the best of cases, it is in fact only 41%, and this after 3 successive extractions, as is indicated in Example 3 of the description of this European patent application.

It is to be noted that by this process, the fat must be kept melted under an oxygen-free atmosphere. These technical characteristics imply recourse to a specific apparatus for maintaining temperature and supply of neutral gas. Lastly, the time necessary for the first complexation phase is a minimum of 30 minutes and actually from 2-3 hours as indicated in the example. This process is hence necessarily expensive in time, equipment and in energy.

Apart from these scarcely satisfactory performances this process constitutes a succession of additional steps in the manufacture of a foodstuff and forms part of an industrial procedure which is somewhat irrational. In fact it consists firstly of manufacturing the fat in anhydrous form, of making it undergo the cumbersome cholesterol extraction treatment, then of bringing it to a suitable state in which it will be utilizable in a process for producing foodstuffs. In the case of dairy fat, these foodstuffs can be reconstituted milks for consumption, yogurts, cheeses or the like. It is clear that such a scheme is not acceptable from the point of view of industrial profitability.

It is apparent from the foregoing that none of these solutions of the prior art has enabled until now the production of food fats impoverished in sterols— especially in cholesterol, satisfactorily, that is to say, responding to the industrial conditions of economic profitability, flexibility of use, and quality of the final products.

In addition, with regard to this quality of the final products obtained by applying known processes, it is important to observe that these products, like any dairy fat, can be oxidized and become rancid, which makes them unsuitable for consumption. In fact, dairy fat comprises unsaturated compounds reacting very easily with the oxygen of the air. This is the reason why, in the process described in patent application EP n° 0 256 911 mentioned above, there is provision for operating under nitrogen. But it remains nonetheless that the products so treated stay very strongly subject to becoming rancid, which inevitably undermines their food value.

SUMMARY OF THE INVENTION

One of the essential objects of the present invention is hence to overcome the drawbacks of the aforementioned prior art by providing a process for the preparation of dairy products with a reduced content of sterols and especially of cholesterol. Consequently, it is no longer a matter of extracting sterols from intermediate products which are animal fats, but on the other hand to integrate the removal of sterols into the production chain for dairy products. Thus, the present invention is an improvement in a process for manufacturing dairy products reduced in sterol content, including cholesterol content, wherein an oil-in-water emulsion comprising dairy fat is used as a starting material, fat is separated from said emulsion in an intermediate step of said manufacturing process and treated with cyclodextrin to remove sterols as inclusion complexes of cyclodextrin and sterols, oil-in-water emulsion with said treated fat is reformed and used to complete said dairy product manufacture.

This reformulation of the technical problem, even if it seems a priori more logical did not establish itself evidently due to the fact of the existence of a certain number of obstacles and of technical prejudices which have never been overcome in spite of the already old knowledge of the problems associated with food cholesterol.

In the first place, it must be realized that dairy oil-in-water emulsions like milk and cream are heterogeneous and complex mediums constituted by colloidal suspensions of particles (globules of fat and proteinic micellae) in a dispersing aqueous phase. The cholesterol only represents a minor constituent among many other free substances such as proteins or fatty acids. In addition, it is integrated into the membranal structure of the fat globules. It is hence a priori not directly accessible. Knowing this, it was reasonable to conclude therefrom that cyclodextrin contacted with such a medium would have no particular affinity for the cholesterol due to the fact of the considerable competition existing between the compounds of the medium with respect to cyclodextrin, and the situation of the cholesterol in the membranes of the fat globules.

In the second place, even on the hypothesis according to which the cyclodextrin would complex the cholesterol, the appearance of an emulsion inversion phenomenon could be feared due to the fact of the known role of cholesterol in the stabilization of the membranal structure of the fat globules constituting the oil-in-water emulsion. Now it is evident that a dairy medium which has undergone an emulsion inversion is no longer a suitable basic raw material for the manufacture of many dairy products. To exploit it, it would hence be indispensable to reprocess it by resorting, for example, to exogenic emulsifiers. Here the failings of known processes would again be encountered.

In the third place, it is indicated in a reference work ("Science of Milk", Charles ALAIS, page 102) that cholesterol has also an role of inhibitor of lipases as the cause of rancidity development of dairy oil-in-water emulsions. This constitutes, here again, a brake on the idea of extraction of the cholesterol from such media.

DETAILED DESCRIPTION OF THE INVENTION

By going against all these technical prejudices, Applicant has demonstrated an inventive step by developing the process according the invention.

Also, it is only after having performed a whole series of studies and tests, notably within the Division Chimie des Corps Gras of IRHO-CIRAD, that Applicant has demonstrated, quite surprisingly and unexpectedly, the fact according to which it was possible to prepare dairy products with a reduced content of sterols, particularly of cholesterol, by contacting an oil-in-water emulsion comprising fats of dairy origin with cyclodextrin in a sufficient amount to form inclusion complexes with sterols so that the latter could be extracted from the fat, and, simultaneously or not, separating said complexes from the medium without inversing the oil-in-water starting emulsion into water-in-oil emulsion.

It appeared first of all, under the conditions of the process, that the cyclodextrin has a remarkable selective affinity with respect to the cholesterol present at the surface of the fat globules contained in an oil-in-water dairy emulsion.

It was also observed that the starting oil-in-water emulsion was not inverted into a water-in-oil emulsion, and this in spite of the removal of cholesterol, which is, however, supposed to be an important agent in the physical stability of the emulsion by reason of its surface active role.

In addition, in the process according to the present invention the fat is integrated into an oil-in-water emulsion, which permits its contact with the oxygen of the air to be limited and hence oxidation phenomena.

In addition, and again more unexpectedly and advantageously, the dairy products derived from the process according to invention show an increased stability with respect to oxidation with respect to control products. Thus, the problems of becoming rancid which cause the appearance of a redhibitory taste in the dairy products are at least partly resolved by employing the process according to the invention. It is all the more astonishing that, as specified above, the cholesterol extracted is known to be an inhibitor of the action of lipases which play a part in oxidation phenomena.

Without this being able to constitute a limitation of the present invention it may be thought that this improvement in the resistance to oxidation of the products prepared according to the invention is due particularly to the fact that the free fatty acids, naturally present in the fat of the milk or coming from lipolysis of the tryglycerides, is also complexed with the cyclodextrin and are separated at the same time as the cyclodextrin-cholesterol complexes. Now these free fatty acids, often unsaturated, have a strong propensity to become oxidized and thereby to induce also the oxidation of other unsaturated compounds of the fat such as triglycerides, vitamins and phospholipids.

This propensity to become oxidized can be appreciated by measuring the acid index whilst the peroxide index is a significant parameter of the oxidation level of the dairy fats as well of products containing them.

According to the present invention the starting oil-in-water emulsion used may be milk or cream of any animal origin (cows or the like) and of any kind.

The distinction between milk and cream will be made by considering that the first has a concentration of fat less than or equal to 10% by weight while that of the second is higher than 10% by weight.

The milk or cream can especially be raw, heat-treated (pasteurization, UHT sterilization), enriched in fat, homogenized or reconstituted for example, from anhydrous dairy fat and from skimmed milk.

Within the scope of the invention, the term "cyclodextrin" must be understood as encompassing cyclic oligosaccharides constituted by 6, 7 or 8 glucopyranose units of which one at least can be mono- or poly-substituted, the polymers of which the monomers are constituted by these cyclic oligo-saccharides, and those products grafted or immobilized on an inert support.

The cyclodextrin employed, can hence be of the alpha, beta or gamma type, preferably beta, substituted or not. The mono- or polysubstituent groups of the cyclodextrin can be particularly alkyls such as hydroxypropyl or saccharides of the glycosyl, maltosyl type or the like.

Cyclodextrin in polymerised form, cross-linked or not, being usable in the process according to the invention, is for example of the type of that obtained by polymerisation of monomers of beta-cyclodextrin with epichlorhydrin.

According to the first embodiment of the process of the invention the step of contacting consists of adding the cyclodextrin to the starting oil-in-water emulsion, then mixing these two compounds by moderate stirring for a time t sufficient to permit the formation of cyclodextrin-sterol (cholesterol) complexes.

The temperature at which this contacting is performed is preferably higher than or equal to 1° C., preferably at 15° C. while t is greater than or equal to some seconds, preferably some minutes.

Moreover, is turns out that the concentration of cyclodextrin must be comprised between 0.01 and 100% by weight with respect to the dairy fat, preferably between 1 and 50% by weight, and, more preferably still, between 2 and 25% by weight.

The cyclodextrin-oil-in-water emulsion starting mixture is, preferably, subject to at least one physical separation treatment of the complexes formed occurring in water-soluble form or not.

To remove the complexes in water-insoluble form, various treatments can be employed. It may be centrifugation, decantation, filtration or any other technique known in itself and appropriate.

In order to improve the efficiency of such a treatment, it is convenient, according to the invention and preferably when the cyclodextrin is in non-polymerised form, to reduce the solubility of the complexes formed by performing it at a temperature, preferably equal or below 20° C., for example equal to 4° C. In this way, the proportion of insoluble complexes is increased, their separation of the one or more liquid phases thereof is hence facilitated.

In the case of centrifugation, a liquid portion and a solid portion forming the centrifugation pellet are obtained. This liquid portion is constituted by a supernatant fat phase or cream from which have been extracted at least in part the sterol complexes (cholesterol)-cyclodextrin because of their weak affinity for the fat, and an aqueous phase or skimmed milk containing a larger or smaller amount of soluble complexes according to the treatment temperature chosen.

The skimmed milk and the cream so obtained may be homogenized to form a reconstituted whole milk or be used separately.

If the physical treatment of separation chosen is a filtration, the retentate comprises the complexes insoluble in water whilst the filtrate is an undephased oil-in-water emulsion. The product obtained has a low content of sterols and particularly of cholesterol and is useful in the dairy industry as a raw material, as an intermediate product or as a finished product.

According to an advantageous characteristic of the invention, the complexes in soluble form are removed by means of a physical separation treatment of the ultra-filtration type, inverse osmosis or the like.

Such techniques are perfectly mastered by the technician skilled in the art. According to the invention, they may be applied directly to the mixture starting emulsion/cyclodextrin, to the aqueous phase (skimmed milk) obtained from centrifugation or again on the filtrate derived from passage of the mixture over a membrane. They consist of concentrating the substrate concerned by passage through a selective membrane, so as to remove the water as well as any soluble substances among which figure a portion of the cyclodextrin-cholesterol complexes.

According to a modification of the first embodiment of the process according to the invention, applying more specifically to the manufacture of cheeses of the type comprising a coagulation step leading to the formation of a curd and at least one step of extraction of the whey such as draining or pressing, the milk is preferably employed as an oil-in-water starting emulsion and recourse is had to a coagulating agent.

The latter is added to the milk previously and/or simultaneously and/or subsequently to the contacting of the milk with the cyclodextrin.

This enables the obtaining on the one hand, of a curd adapted to undergo any sort of cheese transformation and on the other hand, whey or aqueous phase containing all or part of the complexes formed. This whey is capable of being at least partly separated from the curd in the course of at least one extraction step integrating into the manufacture of cheese.

The coagulation of the casein of the milk occasions a contraction of the regular network formed by the coagulated proteins and containing fat globules and the serum, with progressive expulsion of the latter. This phenomenon is commonly named syneresis. It enables within the scope of the process of the invention, separation of the water-soluble cholesterol-cyclodextrin complexes from the curd.

The latter then has the advantage of being notably impoverished in cholesterol.

The coagulant agent employed is constituted either by at least one acidogen such as glucono-delta-lactone and/or by lactic ferments, or by at least one coagulating enzyme of a suitable nature such as rennet, or by both.

It is self-evident that this modification of the process according to the invention may be applied to any cheese manufacture of the type defined above and known by the technician competent in the field concerned. It does not necessitate any additional equipment and does not appreciably prolong the manufacturing times.

In addition, the addition of cyclodextrin does not result in any troublesome incidence either qualitatively or quantitatively on the low cholesterol content cheeses obtained.

According to a second embodiment of the process of the invention, the contacting of the oil-in-water starting emulsion comprising dairy fats with cyclodextrin, as well as the separation of the complexes formed of the starting emulsion are performed substantially simultaneously and consists of making said starting emulsion migrate through an adsorbent or absorbent constituted at least in part by cyclodextrin.

It is preferably chromatography on a column containing advantageously beta-cyclodextrin in polymerized form, cross-linked or not, and obtained for example by polymerization by means of a bifunctional compound such as epichlorhydrin.

According to a modification, the cyclodextrin can be immobilized on a support constituted for example of glass beads. This is more particularly applicable to the case where the cyclodextrin is in the form of monomers.

According to an advantageous feature of the invention, the oil-in-water starting emulsion is brought, before migration, to a temperature comprised between 5° and 60° C.

In the case of milk, this temperature is preferably comprised between 5° and 35° C. On the other hand, for cream, more viscous, it is advantageously comprised between 35° and 60° C.

In any case, the invention will be better understood by means of the non-limiting examples which follow, of the practising of the process of preparation of dairy products with a low sterol content and especially of cholesterol, that it concerns.

EXAMPLE 1

Preparation of a cream impoverished in cholesterol by the addition of beta-cyclodextrin to milk In this example, the starting material is a raw cow's milk unpasteurized and unhomogenized. It contains 38 g/l of fat.

Powdered beta-cyclodextrin, marketed by the ROQUETTE FRERES COMPANY under the registered trade mark KLEPTOS ® and containing 13.6% of water, is added to whole milk brought to a temperature of about 25° C. in the proportion of 1% by weight with respect to the milk, namely 27% by weight with respect to the fat.

The whole milk/beta-cyclodextrin mixture kept at this temperature of 25° C. is stirred intensely manually, for about 20 seconds. It is then cooled to 4° C. so as to insolubilize at least in part the complexes formed, then centrifuged at this temperature and at 8000 rpm for 20 minutes.

A control milk, without beta-cyclodextrin, is cooled and centrifuged, under the same conditions as those described above.

Before centrifugation, two distinct phases are obtained in the case of milk not containing beta-cyclodextrin. The first, supernatant, is cream. The second, heavier, is skimmed milk. For the test with beta-cyclodextrin, a third phase appears in the form of a solid pellet.

The total cholesterol contained in supernatant creams and in skimmed milks is assayed by gas phase chromatography after saponification, extraction of the unsaponifiable and silylation.

The following results were obtained:

|  |  | Control: without addition of $\beta$-cyclodextrin | Test with 1% of $\beta$-cyclodextrin added to the whole milk |
|---|---|---|---|
| Creams | Cholesterol in % of the cream supernatant cream | 0.21 | 0.10 |
| Skimmed milks | Cholesterol in % of skimmed milk | $3.0 \times 10^{-3}$ | $2.1 \times 10^{-3}$ |

The cream of the milk treated with beta-cyclodextrin according to the invention is poor in cholesterol. The reduction ratio with respect to the cream of the control milk is of the order of 52%.

The skimmed milk obtained by employing the process according to the invention does not contain more cholesterol than the control skimmed milk.

The acid index of the creams is measured by acidimetric filtration in milliliters of potassium hydroxide per 100 grams of fat (Method AFNOR T 60204). The control cream has after preparation an acid index of 0.47, while that of the test cream is 0.22.

After 15 days storage in the open air and at 4° C., the control cream has an acid index of 1.5 and has a pronounced rancid taste, while the test cream has an acid index of 0.90 and has the taste of fresh cream. The improvement of the stability of the latter with respect to oxidation or rancidity formation is hence well demonstrated.

EXAMPLE 2

Cholesterol ratio of supernatant creams as a function of the amounts of beta-cyclodextrin employed in the milk In this example, the milk used is the same as that employed in example 1.

Increasing amounts of beta-cyclodextrin are added to whole milk.

The whole milk beta-cyclodextrin mixtures are stirred slowly mechanically for 15 minutes, and at ambient temperature. They are then cooled to 4° C. and centrifuged at this temperature at 8000 rpm for 20 minutes.

The cholesterol determinations are carried out as described in example 1.

|  | Control without β-cyclo- dextrin | Tests with β-cyclodextrin Amounts introduced in % of the whole milk | | | | |
| --- | --- | --- | --- | --- | --- | --- |
|  |  | 0.1 | 0.3 | 0.6 | 0.9 | 1.2 |
| Cholesterol in the supernatant creams (in %) | 0.21 | 0.18 | 0.17 | 0.14 | 0.10 | 0.08 |

When the amounts of beta-cyclodextrin introduced into the whole milk increase, the cholesterol present in the supernatant creams diminishes.

EXAMPLE 3

Preparation of a "whole" milk poor in cholesterol by recombination of the cream and of the skimmed milk derived from the process of preparation according to the invention described in example 1

The cream obtained according to the invention, after treatment of the raw milk, with 1% beta-cyclodextrin, is recombined with the skimmed milk by homogenization at 8000 rpm for 20 seconds.

The whole milk so prepared has a reduced cholesterol ratio of 51% with respect to the control whole milk obtained in the same manner. The two milks have an identical pH of 6.90.

In addition, the whole milk obtained by employing the process according to the invention possesses organoleptic qualities and a physical stability on storage at 5° C., comparable with the control whole milk.

As regards the stability to oxidation, that of the whole milk obtained by employing the process of the invention is superior to that of the control whole milk.

EXAMPLE 4

Preparation of a cream with low cholesterol content by the addition of polymerized beta-cyclodextrin and filtration on a membrane The cream used in this example is a UHT commercial cream containing 35% of fat and 0.12% of total cholesterol. It contains 99.98% of the lipids contained in the initial milk.

The cyclodextrin used is a beta-cyclodextrin polymerized with epichlorhydrin.

Cream is heated to 40° C. An amount of 2% by weight of polymerized beta-cyclodextrin, namely 6% by weight with respect to the fat, is added to the cream. The whole is stirred for 10 minutes at this temperature, then filtered on a membrane.

The filtered cream has not been destabilized by the addition of the cyclodextrin. It has a total cholesterol content of 0.07% by weight namely a reduction of 42% of the cholesterol content.

EXAMPLE 5

Preparation of a whole milk poor in cholesterol by passage over a column of polymerized beta-cyclodextrin In this example, the starting milk is a raw, non-homogenized and unpasteurized milk, having a fat content of 37.5 g/l, a density of 1.0332 and a total cholesterol content of 21.5 mg per 100 g.

The cyclodextrin employed is a beta-cyclodextrin polymerized with epichlorhydrin.

Preparation of chromatographic columns with polymerized beta-cyclodextrin

The polymerized beta-cyclodextrin is hydrated in 6 to 10 times its weight of water. It is then introduced into a column, and washed with demineralized water.

Passage of the milk over the column

The whole milk brought to a temperature of 20° C. is chromatographed on two different columns prepared as described above. The eluted volumes of milk correspond at least to 50 times the amount of cyclodextrin contained in the column.

The determinations of total cholesterol and of acid indexes were carried out according to the methods described in example 1.

|  |  | Chromatographed milks | |
| --- | --- | --- | --- |
|  | Starting milk | Test 1 | Test 2 |
| Ratio of total cholesterol in mg/100 g of fat | 21.5 | 15.0 | 14.5 |
| Acid index in ml KOH/100 g of fat | 0.45 | 0.25 | 0.20 |

The densities and the contents of fats of the chromatographed whole milks are substantially equal to those of the starting milk namely respectively 1.0332 and 37.3 g/l.

The ratio of cholesterol reduction are of the order of 30% and those of acid index of the order of 50%.

In this example, whole milk constitutes the starting oil-in-water emulsion. Of course, the latter may also be cream. In this case, it is obvious for the man skilled in the art to increase the temperature of passage over the column, taking into account the risk of clogging of the latter by reason of the higher viscosity of cream at ambient temperature.

EXAMPLE 6

Preparation of a curd with low cholesterol content by introduction of beta-cyclodextrin into milk and separation of the complexes formed during draining In this example, the starting emulsion is a pasteurized whole commercial milk containing 36.5 g/l of fat and 0.017% of cholesterol namely 0.46% of cholesterol with respect to the fat.

The coagulant used was constituted by lactic ferments and by an enzyme: rennet.

An amount of 1 liter of milk is seeded by means of pure lactic bacteria developing a low temperature.

At the end of the fermentation, powdered beta-cyclodextrin, marketed by the ROQUETTE FRERES Company under the registered trade mark KLEPTO-SE ® and containing 13.6% of water is added to the milk in the proportion of 1.0% by weight, at a temperature of 18°-20° C.

The milk/beta-cyclodextrin mixture is stirred manually vigorously for about 20 seconds.

The rennetting is then performed at this same temperature of 18°-20° C., in the proportion of 0.01 to 0.02 ml of rennet diluted to 1/10,000 per 1 liter of milk. After 24 hours of coagulation, the curd is drained so as to remove the whey.

A liter of control milk to which beta-cyclodextrin has not been added was treated under the same conditions to obtain a curd.

Assays carried out according to the method described in example 1 gave the following results:

|  | Test with control milk without addition of β-cyclodextrin | Test with milk containing 1% by weight of beta-cyclodextrin |
|---|---|---|
| Cholesterol in % with respect to the fat in the curd | 0.40 | 0.19 |

The ratio of cholesterol reduction of the curd obtained by employing the process according to the invention is of the order of 52%.

After 15 days of storage of the curds in the open air at 4° C., it was apparent that the curd prepared with the addition of beta-cyclodextrin to the milk had suffered less from rancidity formation than that prepared without the addition of beta-cyclodextrin to the milk.

It was also observed that the addition of beta-cyclodextrin does not disturb the cheesemaking capacity of the milk. Besides a slight reduction in firmness, the curd obtained from the milk treated according to the invention has substantially the same qualities as that obtained from the control milk.

It is apparent from the examples described above that the process according to the invention enables dairy products to be obtained with increased stability to oxidation and with a low content of sterols and particularly of cholesterol particularly easily and economically.

From starting emulsions such as milk or cream, this process enables particularly the preparation of whole milk, cream, of milk especially skim milk, and of cholesterol-reduced cheese.

It is clear that these products can be intended directly for consumption, or converted into various finished or semi-finished dairy products.

Thus the cholesterol-reduced whole milk can serve as a base for the preparation of yoghurts, of cheeses, of creams themselves useful for example as a raw material in the manufacture of butter or in a form converted or not as a foodstuff ingredient, or the like.

A cream reduced in cholesterol by employing the process according to the invention can be, either homogenized with a standard skimmed milk to form a reconstituted whole milk, directly consumable or usable in the manufacture of milk products, or used also as a directly consumable product or as a starting material or intermediate material in the manufacture of milk products.

This enumeration is in no way limiting. It is intended to give an indication of the multiple outlets of the dairy products obtained by employing the process according to the invention.

We claim:

1. In a process for manufacturing dairy products reduced in sterol content, including cholesterol content, wherein an oil-in-water emulsion comprising dairy fat is used as a starting material, fat is separated from said emulsion in an intermediate step of said manufacturing process and treated with cyclodextrin to remove sterols as inclusion complexes of cyclodextrin and sterols, oil-in-water emulsion with said treated fat is reformed and used to complete said dairy product manufacture, the improvement comprising directly contacting said oil-in-water emulsion starting material with cyclodextrin during said manufacturing process, without any intermediate step of separating said fat from said oil-in-water emulsion, to form inclusion complexes with the sterols and separating directly from the contacted oil-in-water emulsion at least part of said complexes.

2. Process according to claim 1, wherein the starting material is milk or cream, the fat concentration of the milk being less than or equal to 10% by weight and that of the cream being greater than 10% by weight.

3. Process according to claim 1, wherein the cyclodextrin employed is of the alpha-, beta- or gamma-type, substituted or not.

4. Process according to claim 1, wherein the cyclodextrin is put into contact with the starting material at a temperature greater than or equal to 1° C.

5. Process according to claim 1, wherein the cyclodextrin is put into contact with the starting material at a temperature greater than or equal to 15° C.

6. Process according to claim 1, wherein the cyclodextrin concentration is comprised of between 0.01 and 100% by weight with respect to the dairy fat contained in the starting material.

7. Process according to claim 1, wherein the cyclodextrin concentration is comprised of between 1 and 50% by weight with respect to the dairy fat contained in the starting material.

8. Process according to claim 1, wherein the cyclodextrin concentration is comprised between 2 and 25% by weight with respect to the dairy fat contained in the starting material.

9. Process according to claim 1, wherein the cyclodextrin separation of the complexes is a physical separation.

10. Process according to claim 9, wherein the physical separation comprises centrifugation, decantation or filtration type.

11. Process according to claim 9, wherein the physical separation comprises ultrafiltration or inverse osmosis type.

12. Process according to claim 9, wherein the cyclodextrin used is in non-polymerized form and wherein the physical separation treatment is carried out at a temperature selected so as to reduce the solubility in water of the complexes formed, this temperature being less than or equal to 20° C.

13. Process according to claim 9, wherein the cyclodextrin used is in non-polymerized form and wherein the physical separation treatment is carried out at a temperature selected so as to reduce the solubility in water of the complexes formed, this temperature being of the order of 4° C.

14. Process according to claim 1, for the manufacture of cheeses of the type comprising a coagulation step leading to the formation of a curd and at least one step of extraction of the whey, wherein the starting oil-in-water emulsion is a milk and comprises adding to the starting oil-in-water emulsion a coagulant so as to obtain, on the one hand, a curd suitable for undergoing any cheese-making transformation and, on the other hand, a whey or aqueous phase containing all or part of the complexes formed and capable of being at least partly separated from the curd in the course of an extraction step.

15. Process according to claim 14, wherein the coagulating agent is constituted by at least one acidogen, by lactic ferments or their mixture, associated with or replaced by at least one coagulating enzyme of a suitable nature such as rennet.

16. Process according to claim 1, wherein the contacting and the separation are carried out substantially simultaneously and comprises causing the starting oil-in-water emulsion to migrate through an adsorbent or absorbent constituted at least in part by cyclodextrin.

17. Process according to claim 16, wherein the cyclodextrin is immobilized on a support.

* * * * *